United States Patent [19]

Ikeda et al.

[11] Patent Number: 5,574,279
[45] Date of Patent: Nov. 12, 1996

[54] PROBE WITH TORSION LEVER STRUCTURE, AND SCANNING PROBE MICROSCOPE AND RECORD/REPRODUCING APPARATUS UTILIZING THE SAME

[75] Inventors: Tsutomu Ikeda, Hachioji; Takehiko Kawasaki, Atsugi; Yasuhiro Shimada, Hadano, all of Japan

[73] Assignee: Canon Kabushiki Kaisha, Tokyo, Japan

[21] Appl. No.: 530,965

[22] Filed: Sep. 20, 1995

[30] Foreign Application Priority Data

Sep. 21, 1994 [JP] Japan .................................. 6-226189

[51] Int. Cl.⁶ .................................................. H01J 37/26
[52] U.S. Cl. ........................................ 250/306; 369/126
[58] Field of Search ............................ 250/306; 369/126

[56] References Cited

U.S. PATENT DOCUMENTS

| | | | |
|---|---|---|---|
| 4,668,865 | 5/1987 | Gimzewski et al. | 250/306 |
| 4,906,840 | 3/1990 | Zdeblick et al. | 250/306 |
| 5,283,437 | 2/1994 | Greschner et al. | 250/306 |
| 5,317,152 | 5/1994 | Takamatsu et al. | 250/306 |
| 5,357,108 | 10/1994 | Suzuki et al. | 250/306 |

FOREIGN PATENT DOCUMENTS

| | | |
|---|---|---|
| 63-161552 | 7/1988 | Japan . |
| 63-161553 | 7/1988 | Japan . |
| 4001948 | 1/1992 | Japan . |

OTHER PUBLICATIONS

"Surface Studies by Scanning Tunneling Microscopy" by G. Binning et al. The American Physical Society, vol. 49. No. 1 Jul. 5, 1982; p. 57.
"Topography and local modification of the $HoBa_2Cu_3O_{7-x}$(001) surface using scanning tunneling microscopy" by H. Heinzelmann et al.; Applied Physics Letters; vol. 53; Dec. 12, 1988, No. 24; pp. 2447–2449.
"Nanometer scale structure fabrication with the scanning tunneling microscope" by U. Staufer; Applied Physics Ltrs, vol. 51, Jul. 27, 1987 No. 4 pp. 244–246.

Primary Examiner—Jack I. Berman
Attorney, Agent, or Firm—Fitzpatrick, Cella, Harper & Scinto

[57] ABSTRACT

A probe of torsion lever structure is provided with a flat-plate driving unit formed on a substrate with a gap therebetween, two beams positioned along a straight line parallel to the substrate and rotatably supporting the flat plate-shaped driving unit relative to the substrate, a drive device for driving the flat plate-shaped driving unit, and a tip for information input/output provided at an end of the flat plate-shaped driving unit. The two beams are provided at a position between the end of the flat plate-shaped driving unit and the other end thereof, closer to the other end than the center between the end and the other end of the flat plate-shaped driving unit.

8 Claims, 11 Drawing Sheets

5,574,279

PROBE WITH TORSION LEVER STRUCTURE, AND SCANNING PROBE MICROSCOPE AND RECORD/REPRODUCING APPARATUS UTILIZING THE SAME

BACKGROUND OF THE INVENTION

1. Field of the Invention

The present invention relates to a probe with torsion lever structure and a scanning probe microscope and a record/reproducing apparatus utilizing the probe.

2. Related Background Art

The recently developed scanning tunnel microscope (STM) [G. Binning et al., Phys. Rev. Lett., 49, 57(1982)] is capable of directly observing the electron structure of surfacial atoms of a conductive material, whereby both monocrystalline materials and amorphous materials can be observed by a real spatial image of a resolving power.

Such STM, capable of observation with a low electric power without damage by current on the specimen and of functioning on various materials even in the atmospheric condition, is expected to be used in wide applications.

The STM utilizes a tunneling current generated between a metal tip and a conductive substance when they are brought close to a distance of about 1 nm, with a voltage therebetween. This current is extremely sensitive to the variation in the distance between the two, and various information on the electron cloud in the real space can be detected by moving the tip in a scanning motion so as to maintain the tunneling current constant. In this operation there can be obtained a resolving power in the order of 0.1 nm along the plane of the specimen, so that high-density information recording and reproduction in the atomic (sub nanometric) order can be sufficiently realizable by the principle of the STM.

For example, there have been proposed a methods of effecting information recording and reproduction by the STM, utilizing a thin film of an organic compound with π-electrons or a chalcogenide compound, which shows memory effect for the switching characteristics of voltage or current, as the recording layer, as disclosed in the Japanese Patent Laid-open Application Nos. 63-161552 and 63-161553.

These methods, with a bit size for example of 10 nm, enable large-capacity information recording of a high density as high as $10^{12}$ bit/cm$^2$.

For compactizing the apparatus, there is being developed a micromechanical technology of forming plural probes with extremely small movable mechanisms on a semiconductor substrate, through a microphotolithographic process.

The typical micromachine employable in the movable mechanism of such probe can be, for example, an electrostatic cantilever or a piezoelectric bimorph cantilever, as proposed in the U.S. Pat. No. 4,906,840. Such micromachines can be produced by a microphotolithographic process, thus being easily formed as an array with a low cost, and can achieve high-speed response by the compactization. Particularly the electrostatic cantilever, effecting displacement by an electrostatic attracting force generated by an external voltage application, can achieve a larger displacement for a given size, in comparison with the piezoelectric bimorph cantilever which effects displacement spontaneously.

There has also been proposed a structure of electrostatically driving a flat plate portion, maintained on a beam member supported on both ends, utilizing the torsion elasticity thereof (such structure being hereinafter called torsion lever probe), as proposed in the Japanese Patent Laid-open Application No. 4-1948.

In contrast to the cantilever structure, such torsion lever probe can be formed as a microdisplacement device with increased freedom in the rigidity and the resonance frequency, since the bending elasticity of the lever and the torsion elasticity of the beam can be independently selected. Also in contrast to the electrostatic cantilever in which the distance to the opposed specimen is difficult to control as the end of the lever moves toward the specimen under the voltage application, the torsion lever structure has an advantage of easier control of the distance to the specimen as the lever end moves in a direction opposite to the specimen under the voltage application.

FIG. 1 is a perspective view of a torsion lever probe, and FIGS. 2A and 2B are cross-sectional views thereof along a line 2—2 in FIG. 1, respectively in a non-driven state and a driven state of the probe.

Referring to FIG. 1, a substrate 501 is provided thereon with an insulating layer 502, on which formed are a fixed electrode 503 and a flat plate driving unit 508 across a gap 504.

The flat plate driving unit 508 is rotatably supported, through two beams 509 supported at both ends thereof, by support portions 510. The flat plate driving unit 508 is divided into two areas by the rotary axis passing through the beams 509, and an upper driving electrode 507 is formed in one of said areas, opposed to the fixed electrode 503, while a tip 512 for information input/output, connected electrically to a tip wiring 513, is formed at the end of the other area.

In the above-explained structure, an electrostatic attractive force is generated between the fixed electrode 503 and the upper electrode 507 by the application of a voltage therebetween, whereby the upper electrode 507 of the flat plate driving unit 508 is attracted toward the fixed electrode 503. Thus the beams 509 are twisted and the flat plate driving unit 508 rotates about the supporting beams 509 whereby the tip 512 is moved in a direction away from the substrate 501 (cf. FIG. 2B). Such movement can be utilized for controlling the distance between the tip 512, formed at the end of the flat plate driving unit 508, and the recording medium or observed specimen (not shown).

In such torsion lever probe, however, the movable distance of the tip is limited to the magnitude of the gap, namely the distance between the fixed electrode and the end of the flat plate driving unit, since said flat plate driving unit is rotated about the supporting beams. If the rotary axis of the beams is formed at the center of the flat plate driving unit, the movable distance of the tip cannot exceed the magnitude of the gap.

Though it is conceivable to increase the movable distance of the tip by increasing the magnitude of the gap and positioning the flat plate driving unit at a larger distance from the substrate, but such configuration will require a significantly increased electrostatic driving voltage, which may result in various drawbacks in the practice.

SUMMARY OF THE INVENTION

In consideration of the foregoing, an object of the present invention is to provide a probe providing a longer movable distance of the tip, while maintaining satisfactory controllability. Another object of the present invention is to provide a scanning probe microscope and an information record/ reproducing apparatus of satisfactory controllability, utilizing such probe.

The foregoing objects can be attained, according to the present invention, by a probe of torsion lever structure, comprising:

a flat plate-shaped driving unit formed on a substrate with a gap therebetween;

two beams positioned on a straight line parallel to said substrate and rotatably supporting said flat plate-shaped driving unit relative to said substrate;

drive means for driving said flat plate-shaped driving unit; and a tip for information input/output provided at an end of said flat plate-shaped driving unit, wherein said two beams are provided in a position, between said end of said flat plate-shaped driving unit and the other end thereof, closer to said the other end than the center between said end and said the other end.

Also the foregoing objects can be attained, according to the present invention, by a scanning probe microscope comprising:

a flat plate-shaped driving unit formed on a substrate with a gap therebetween;

two beams positioned on a straight line parallel to said substrate and rotatably supporting said flat plate-shaped driving unit relative to said substrate;

drive means for driving said flat plate-shaped driving unit;

a tip for information input/output provided at an end of said flat plate-shaped driving unit;

wherein said two beams are provided in a position, between said end of said flat plate-shaped driving unit and the other end thereof, closer to said the other end than the center between said end and said the other end;

means for detecting a physical action taking place between said tip and an observed specimen; and means for generating surface information of said specimen, based on the result of detection by said detection means.

Also the foregoing objects can be attained, according to the present invention, by an information record/reproducing apparatus comprising:

a flat plate-shaped driving unit formed on a substrate with a gap therebetween;

two beams positioned on a straight line parallel to said substrate and rotatably supporting said flat plate-shaped driving unit relative to said substrate;

drive means for driving said flat plate-shaped driving unit;

a tip for information input/output provided at an end of said flat plate-shaped driving unit;

wherein said two beams are provided in a position, between said end of said flat plate-shaped driving unit and the other end thereof, closer to said the other end than the center between said end and said the other end; and means for recording and reproducing information on or from a recording medium, by means of said tip.

DETAILED DESCRIPTION OF THE PREFERRED EMBODIMENTS

Now the present invention will be clarified in detail by preferred embodiments shown in the attached drawings.

[First embodiment]

Figure 1:
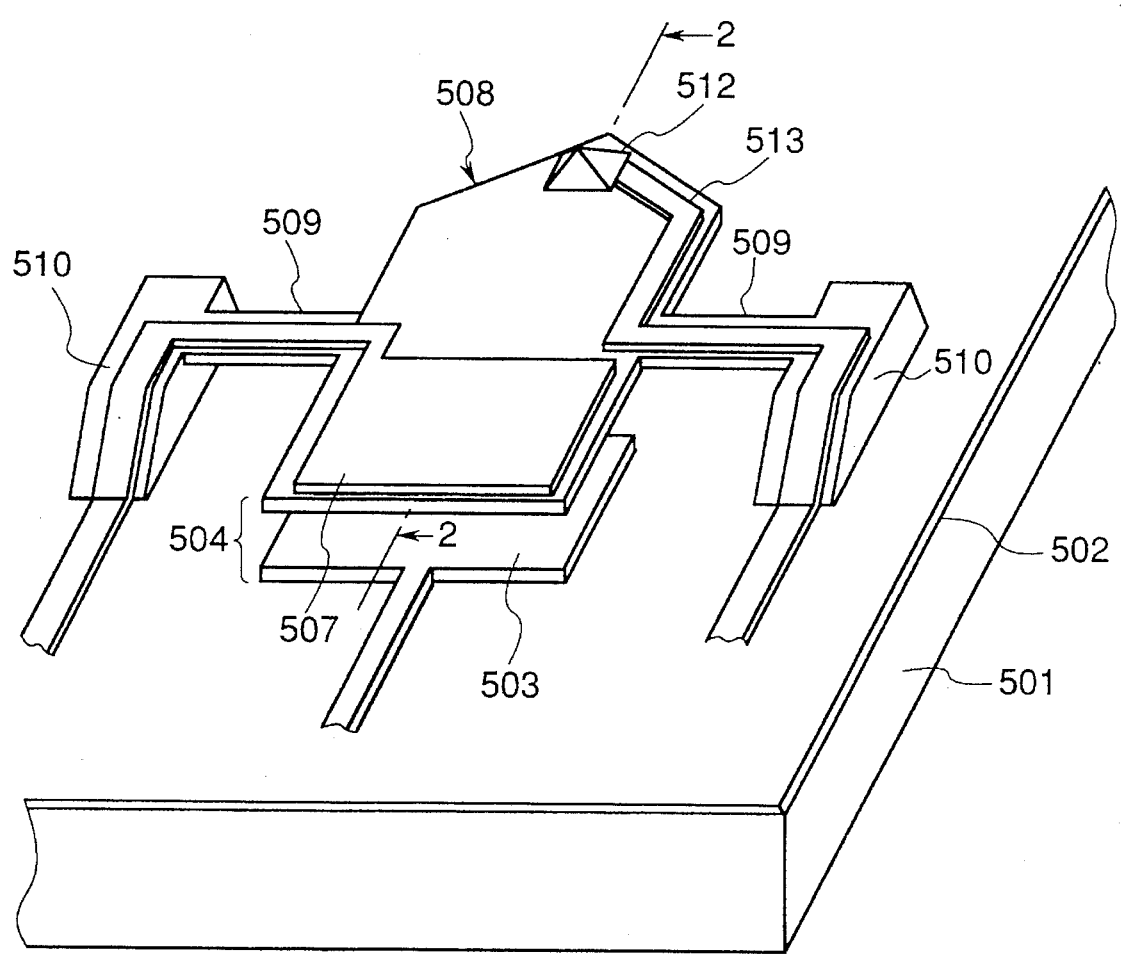
FIG. 1 is a perspective view of a conventional probe of torsion lever structure.
Figure 2A:
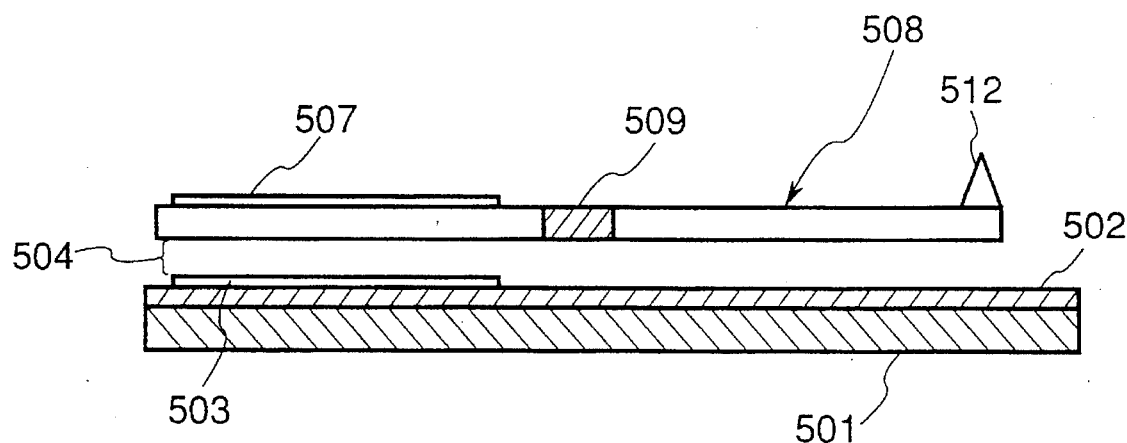
FIGS. 2A and 2B are cross-sectional views of the probe shown in FIG. 1, along a line 2—2 therein, respectively in a non-driven state and in a driven state.
Figure 2B:
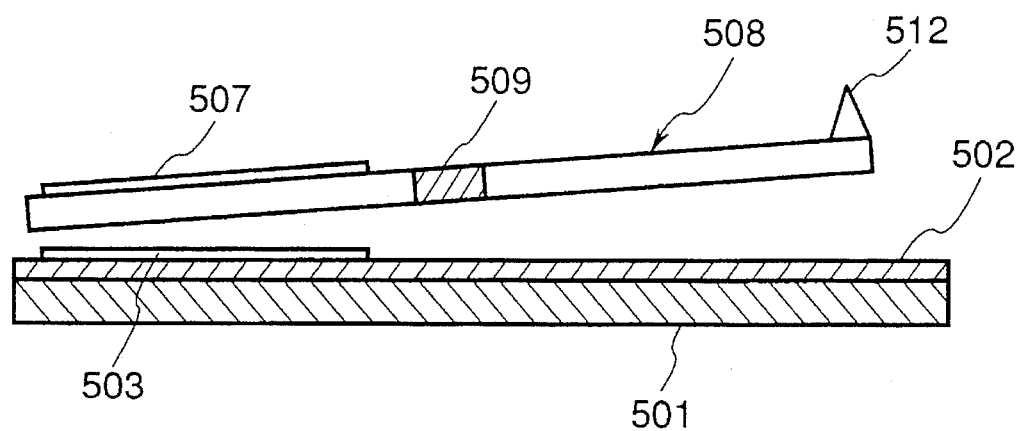
Figure 3A:
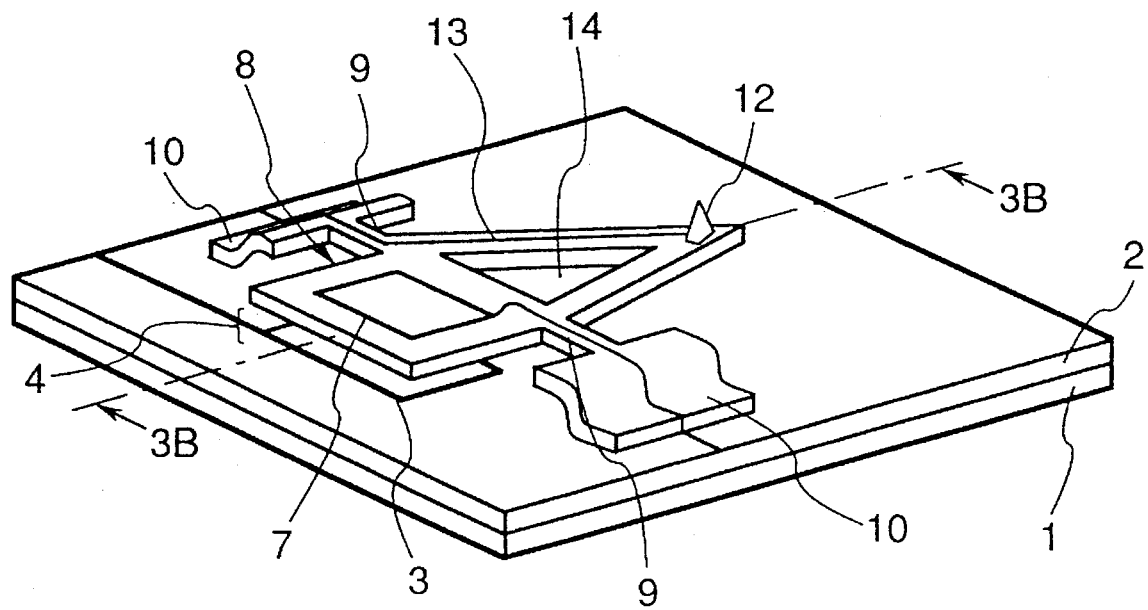
FIGS. 3A and 3B are respectively a perspective view and a cross-sectional view along a line 3B—3B therein, of a probe of torsion lever structure of the present invention.
Figure 3B:
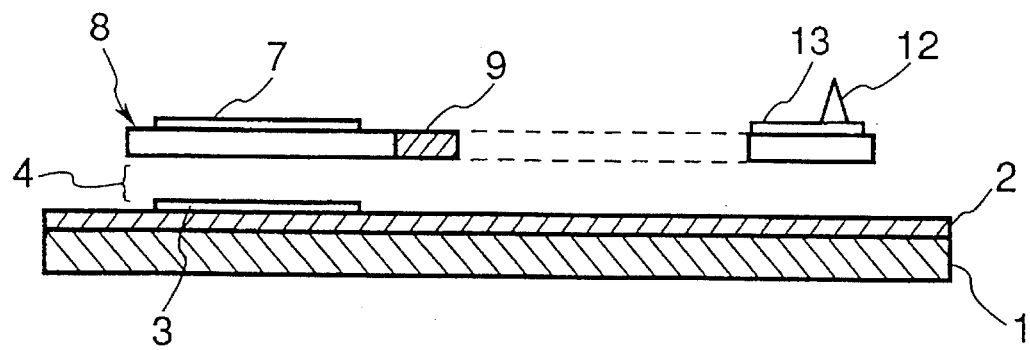

FIGS. 3A and 3B are respectively a perspective view and a cross-sectional view along a line 3B—3B shown therein, of a probe of torsion lever structure of the present invention.

Referring to FIGS. 3A and 3B, a substrate 1 is provided thereon with an insulating layer 2, on which formed are a fixed electrode 3 and a flat plate-shaped driving unit 8 with a gap 4 therebetween. At an end on the upper face of the flat plate-shaped driving unit 8 there is formed a tip 12 for information input/output, and, at the other end an upper driving electrode 7 is formed in a position opposed to the fixed electrode 3. The tip 12 is electrically connected to a wiring 13 formed on the flat plate-shaped driving unit 8. The flat plate-shaped driving unit 8 is supported, at both sides thereof, by two beams 9, which are positioned along a straight line and are supported, at both ends, by two support units 10 formed on the insulating layer 2, and is therefore rendered rotatable about an axis passing through said beams 9. The beams 9 are provided in a position, between the front end and the rear end of the flat plate-shaped driving unit 8, closer to the rear end than the center between said front end and said rear end.

In the above-explained configuration, a voltage application between the fixed electrode 3 and the upper electrode 7 generates an electrostatic force therebetween, whereby the upper electrode 7 of the flat plate-shaped driving unit 8 is attracted toward the fixed electrode 3. As a result, the beams 9 are twisted and the entire flat plate-shaped driving unit 8 rotates about the beams 9 supported at both ends and the tip 12 is moved in a direction away from the substrate 1. The above-explained function can be utilized for controlling the distance between the tip 12 formed at the front end of the flat plate-shaped driving unit 8 and a recording medium or a observed specimen (not shown).

In the probe of torsion lever structure of the present embodiment, the distance from the rotary axis of the flat plate-shaped driving unit 8 to the front end having the tip 12 is longer than that to the rear end having the upper electrode 7, so that the movable distance of the tip 12 at the front end is larger than that of the rear end limited by the magnitude of the gap 4 (distance between the fixed electrode 3 and the flat plate-shaped driving unit 8). Consequently there can be obtained an easily controllable probe with a sufficiently large movable distance of the tip 12 even if the magnitude of the gap 4 is maintained same as in the conventional configuration.

On the other hand, when the areas of the flat plate-shaped driving unit 8 divided by the rotary axis thereof are defined as first and second areas, respectively at the front end side having the tip 12 and at the rear end side, the weight ratio W=(weight of the first area)/(weight of the second area) may exceed unity because the front end side with the tip 12 is longer, and, in such case, the moment of inertia becomes larger in said first area than in the second area, whereby the resonance frequency of the flat plate-shaped driving unit 8 becomes lower.

In the present embodiment, therefore, in order to maintain the above-mentioned weight ratio W of the two areas below unity (W<1), the first area is provided with an aperture 14 matching the external form thereof. Such structure allows to balance the moments of inertia in front of and behind the rotary axis in the driven state, thereby preventing the lowering in the resonance frequency. Such prevention of loss in the resonance frequency maintains the high-speed drivability of the probe of torsion lever structure, and is particularly effective in the information record/reproducing apparatus in which high speed drive is required.

However, if the weight ratio W of the first and second areas is selected excessively low in order to maintain approximately equal moments of inertia in said first and second areas, the structural strength of the first area may be adversely affected. Consequently the weight ratio W of the first and second areas is preferably selected within a range 0.5<W<1, more preferably within a range 0.8<W<1.

Now reference is made to FIGS. 4A to 4D and 5A to 5E, for explaining the preparation process of the probe of torsion lever structure of the present embodiment.

FIGS. 4A to 4D show the preparation steps of the probe shown in FIGS. 3A and 3B, and FIGS. 5A to 5E show those of the tip of said probe.

The probe of torsion lever structure is prepared by the following steps, utilizing the semiconductor process technology and the thin film preparation technology.

Figure 4A:
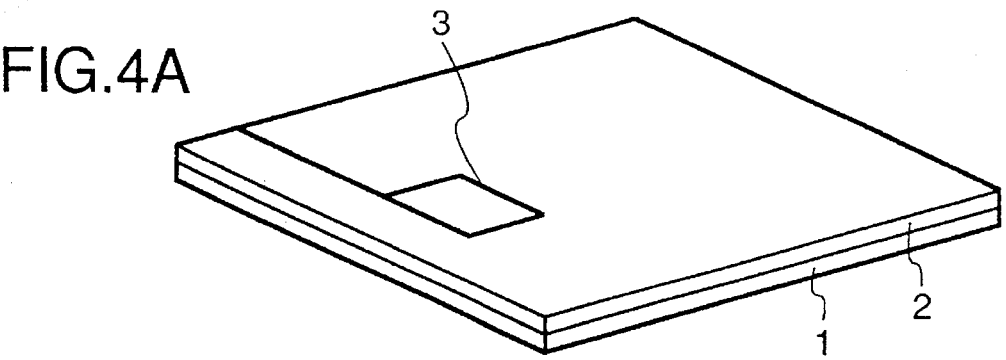
FIGS. 4A to 4D are views showing preparation steps of the probe shown in FIGS. 3A and 3B.

At first, as shown in FIG. 4A, a Si substrate 1 is subjected to the formation of a silicon nitride film, constituting the insulating layer 2, with a thickness of 0.3 μm by low-pressure CVD (LPCVD).

Then, photoresist is coated on the insulating layer 2 and patterned. Subsequently Ti and Pt are sputtered in succession with respective thicknesses of 5 nm and 0.2 μm, and the photoresist is removed to form the fixed electrode 3.

Figure 4B:
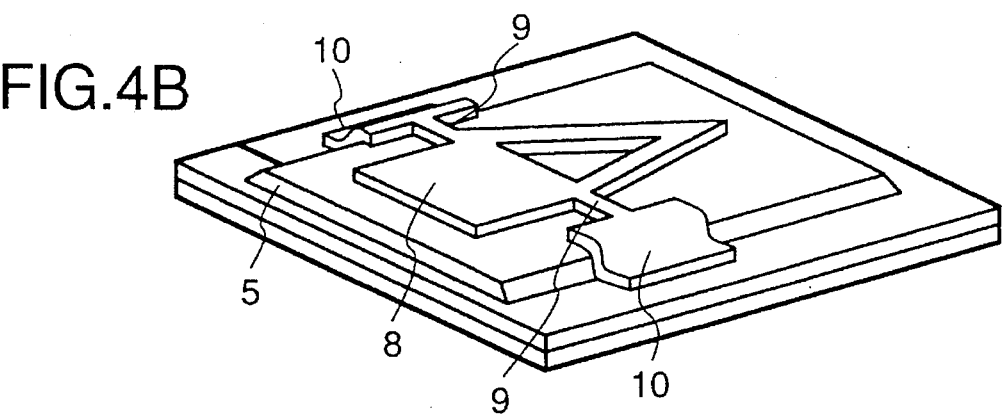

Then, zinc oxide is deposited with a thickness of 2 μm by sputtering onto the insulating layer 2 bearing the fixed electrode 3 thereon, then photoresist is coated thereon and patterned, and the zinc oxide is etched with mixed aqueous solution of hydrogen peroxide and ammonia, to form a sacrifice layer 5, as shown in FIG. 4B.

Subsequently silicon oxide is deposited with a thickness of 1 μm by sputtering, then photoresist is coated thereon and patterned, and silicon oxide is patterned by reactive ion etching (RIE) to form the flat plate-shaped driving unit 8, the beams 9 and the support units 10.

Figure 4C:
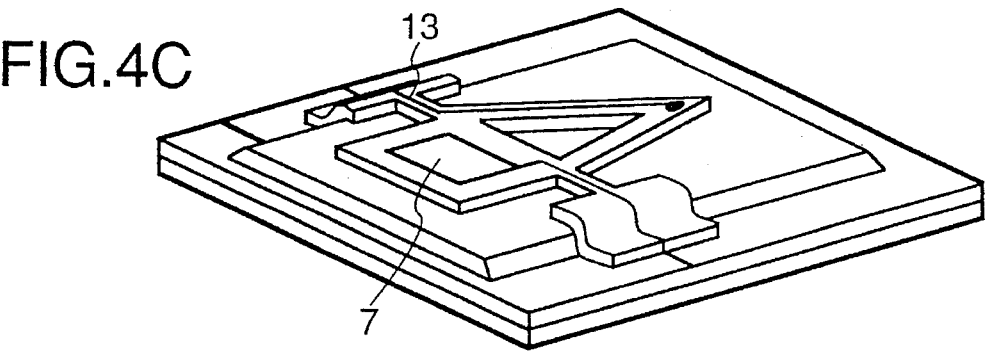

Then photoresist is coated and patterned, and Ti and Au are sputtered in succession, with respective thicknesses of 5 nm and 200 nm. Then the photoresist is removed to form the upper electrode 7 and the tip wiring 13, as shown in FIG. 4C.

Then the tip 12 is formed at the front end of the flat plate-shaped driving unit 8. The forming method thereof is not particularly limited, but, in the present embodiment, it is prepared in the following manner as a representative example.

Figure 5A:
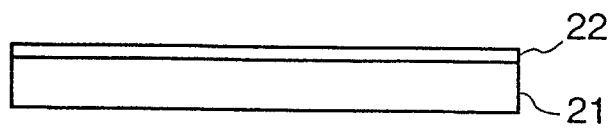
FIGS. 5A to 5E are views showing preparation steps of the tip of the probe shown in FIGS. 3A and 3B.
Figure 5A:

At first, as shown in FIG. 5A, a second Si substrate 21 with a surfacial orientation (100) is subjected to the deposition of a silicon nitride film, as a protective layer 22 for etching, with a thickness of 0.1 μm by low-pressure CVD (LPCVD).

Figure 5B:
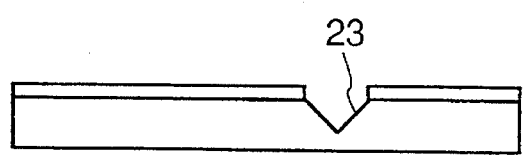
Figure 5B:

Then the protective layer 22 is removed by etching, thereby exposing a part of the second substrate 21, in a rectangular area matching the dimension of the tip 12. Then the second substrate 21 is subjected to crystalline anisotropic etching with aqueous solution of potassium hydroxide heated to 100° C., thereby forming an inverse pyramidal recess 23, constituting a mold for the tip 12, as shown in FIG. 5B.

Figure 5C:
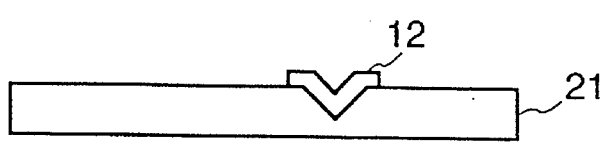
Figure 5C:
Figure 5D:
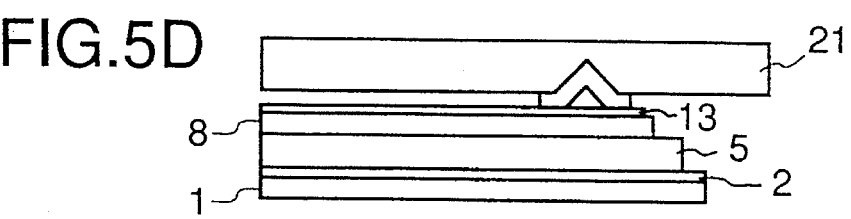
Figure 5D:

After the formation of the recess 23, the remaining silicon nitride film is removed by reactive ion etching, as shown in FIG. 5C. Then photoresist is patterned thereon, and Au is deposited with a thickness of 1 μm by vacuum evaporation. The photoresist is dissolved with acetone to obtain an Au pattern constituting the tip 12.

Figure 5E:
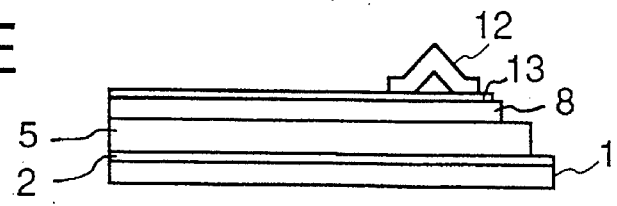

Then the tip 12 is adhered, under a load, to the front end portion of a separately formed flat plate-shaped driving unit 8 (cf. FIG. 5D), and the tip 12 is peeled off from the interface of the second substrate 21, whereby it is transferred onto the substrate 1 as shown in FIG. 5E.

Figure 4D:
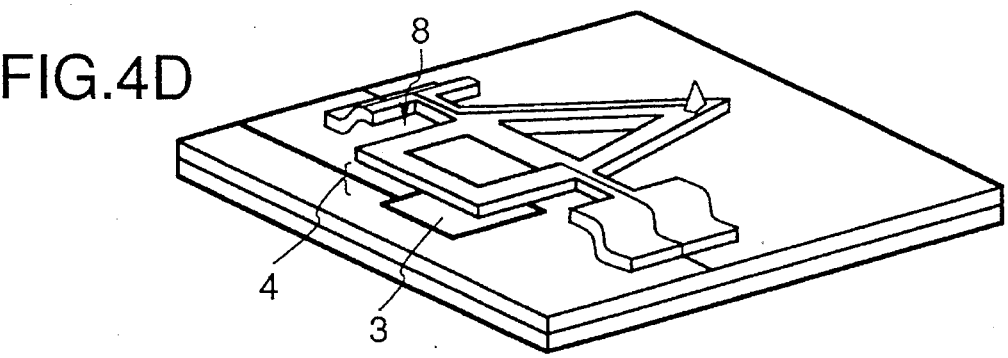

Finally, the zinc oxide sacrifice layer 5 is removed by etching with aqueous solution of acetic acid to form the gap 4 between the flat plate-shaped driving unit 8 and the fixed electrode 3, as shown in FIG. 4D.

The probe of torsion lever structure shown in FIGS. 3A and 3B can be obtained through the above-explained process.

The probe of torsion lever structure prepared in the present embodiment had a longitudinal length of 200 μm and a width of 80 μm in the flat plate-shaped driving unit 8, and a magnitude of the gap 4 of 3 μm. The beams 9 were positioned at a distance of 130 μm from the front end of the flat plate shaped driving unit 8. The aforementioned weight ratio of the first and second areas was 0.82.

When the probe of the present embodiment was driven by a voltage application between the fixed electrode 3 and the upper electrode 7, the movable distance of the tip 12 was 4.3 μm, larger than the magnitude of the gap 4, and the resonance frequency was as high as 26 kHz.

[Second embodiment]

Figure 6:
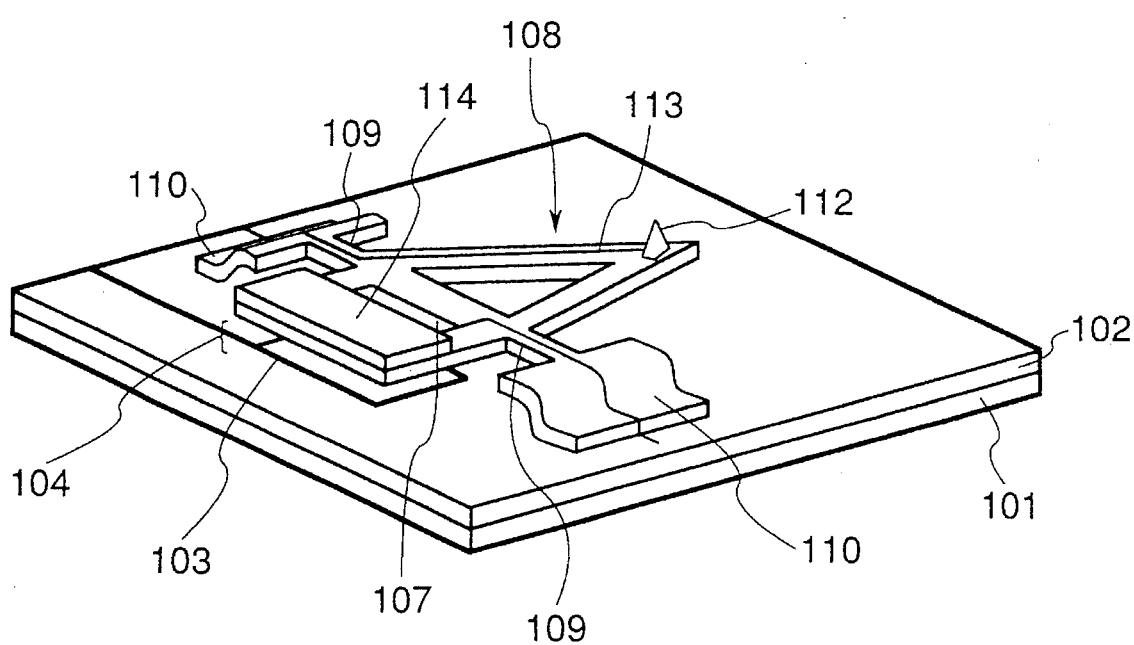
FIG. 6 is a perspective view of a second embodiment of the probe of torsion lever structure of the present invention.

FIG. 6 is a perspective view showing a 2nd embodiment of the probe of torsion lever structure of the present invention.

In the present embodiment, beams 109 are positioned further closer to the rear end of the flat plate-shaped driving unit 108, than in the first embodiment, and, in order to avoid the resulting increase in the weight ratio W of the first and second areas, a weight 114 is provided in the second area, at the rear end of the flat plate-shaped driving unit 108. Other configurations will not be explained as they are similar to those in the 1st embodiment.

As explained in the foregoing, even when the beams 109 are positioned further closer to the rear end of the flat plate-shaped driving unit 108, a weight adjustment of the second area by the weight 114 allows to maintain the weight ratio W of the two areas smaller than unity and to balance the moments of inertia of the first and second areas on both sides of the rotary axis, whereby it is rendered possible to suppress the lowering of the resonance frequency of the flat plate-shaped driving unit 108 while securing a large movable distance of the tip 112.

In the following there will be explained the preparation process of the probe of torsion lever structure of the present embodiment with reference to FIGS. 7A to 7D, which illustrate preparation steps of the probe shown in FIG. 6.

Figure 7A:
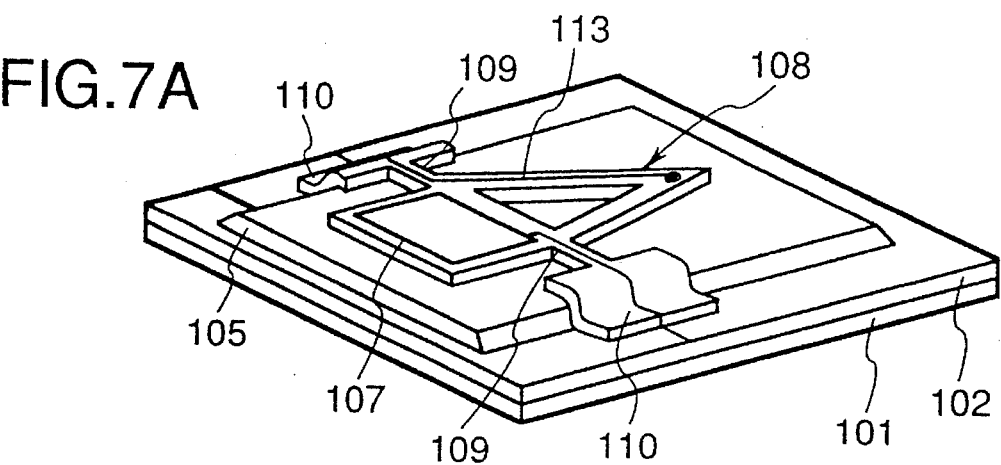
FIGS. 7A to 7D are views showing preparation steps of the probe shown in FIG. 6.

At first, as in the 1st embodiment, a substrate 101 is subjected to the formation of a fixed electrode 103, a sacrifice layer 105 thereon, a flat plate-shaped driving unit 108, beams 109 and support unit 110 thereon. On the flat plate-haped driving unit 108, there are formed an upper electrode 107 and a wiring 113 (FIG. 7A).

Figure 7B:
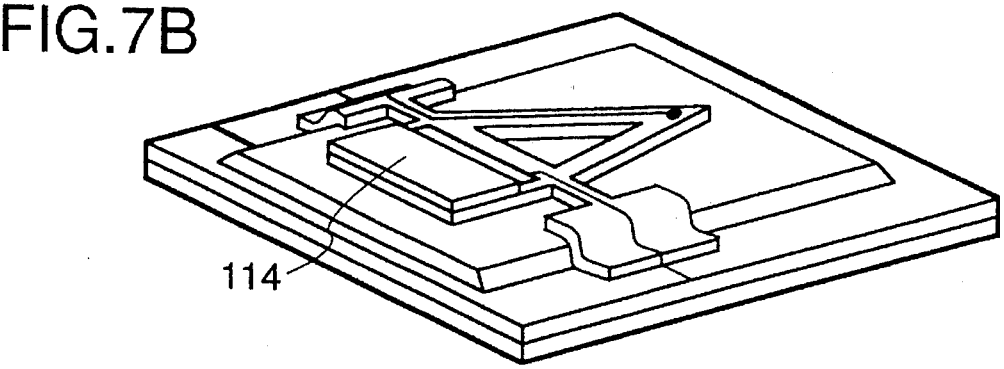
Figure 7C:
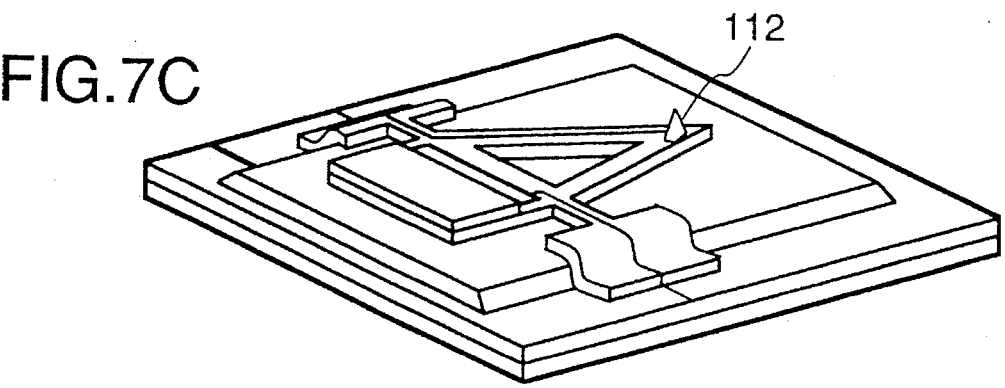

Then photoresist is coated and patterned, and silicon oxide is deposited with a thickness of 1 μm by sputtering. After removal of the photoresist and the silicon oxide film thereon, the remaining silicon oxide film constitutes a weight 114 (FIG. 7B).

Figure 7D:
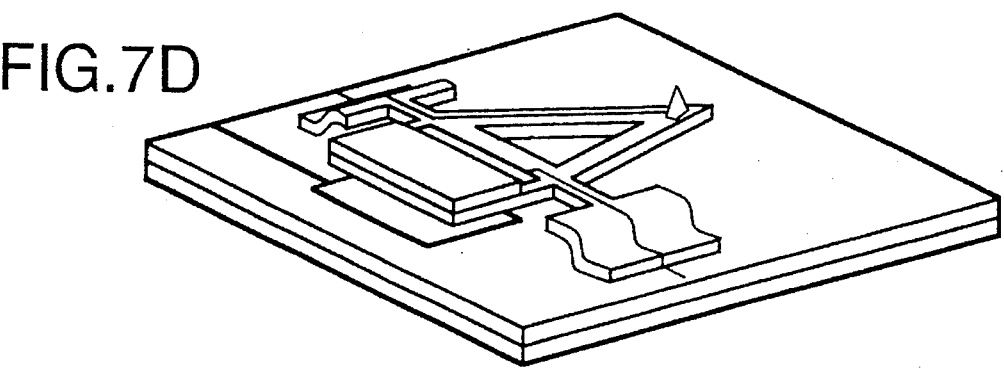

Subsequently a tip 112 is formed on the flat plate-shaped driving unit 108 in the same manner as in the 1st embodiment (FIG. 7C), and the sacrifice layer 105 is finally dissolved to obtain a probe of torsion lever structure (FIG. 7D).

The probe thus prepared had a longitudinal length of 180 μm and a width of 70 μm in the flat plate-shaped driving unit 180 and a gap 104 of 2.5 μm. The beams 109 were positioned at a distance of 130 μm from the front end of the flat plate-shaped driving unit 108, and the aforementioned weight ratio W of the first and second areas was 0.9.

When the probe of the present embodiment was driven by a voltage application between the fixed electrode 103 and the upper electrode 107, the movable distance of the tip 112 was 4.9 μm, larger than the magnitude of the gap 104, and the resonance frequency was as high as 28 kHz.

[Third embodiment]

Figure 8:
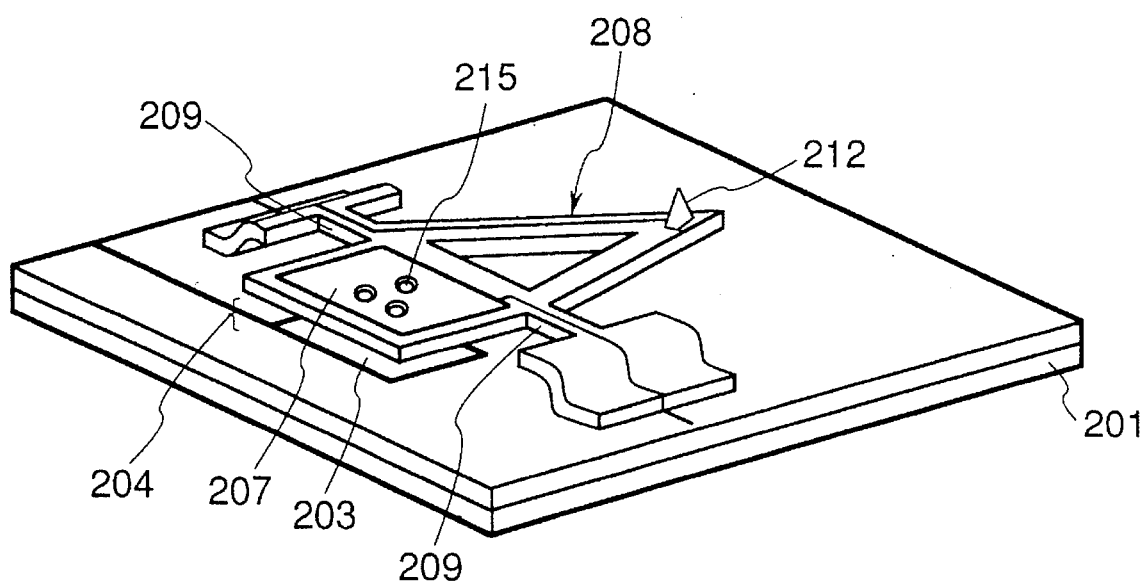
FIG. 8 is a perspective view of a third embodiment of the probe of torsion lever structure of the present invention.

FIG. 8 is a perspective view of a 3rd embodiment of the probe of torsion lever structure of the present invention.

The present embodiment is different from the 1st embodiment in that the second area of the flat plate-shaped driving unit 208 is provided with holes 215, but other configurations and the preparation process are same as those of the 1st embodiment and will not, therefore, be explained further.

Owing to the above-explained structure, the probe of the present embodiment can reduce the damper effect resulting from the air present between the flat plate-shaped driving unit 208 and the substrate 201, thus being capable of preventing deterioration in the high-speed driving performance in the probe of torsion lever structure.

The prepared probe had a longitudinal length of 200 μm and a width of 80 μm in the flat plate-shaped driving unit 208, and a gap 204 of 3 μm. The beams 209 were positioned at a distance of 130 μm from the front end of the flat plate-shaped driving unit 208, and the aforementioned weight ratio W of the first and second areas was 0.86. The holes for reducing the damper effect had a diameter of 10 μm.

When the probe of the present embodiment was driven by a voltage application between the fixed electrode 203 and the upper electrode 207, the movable distance of the tip 212 was 4.3 μm, larger than the magnitude of the gap 204, and the resonance frequency was as high as 26 kHz.

[4th embodiment]

Figure 9:
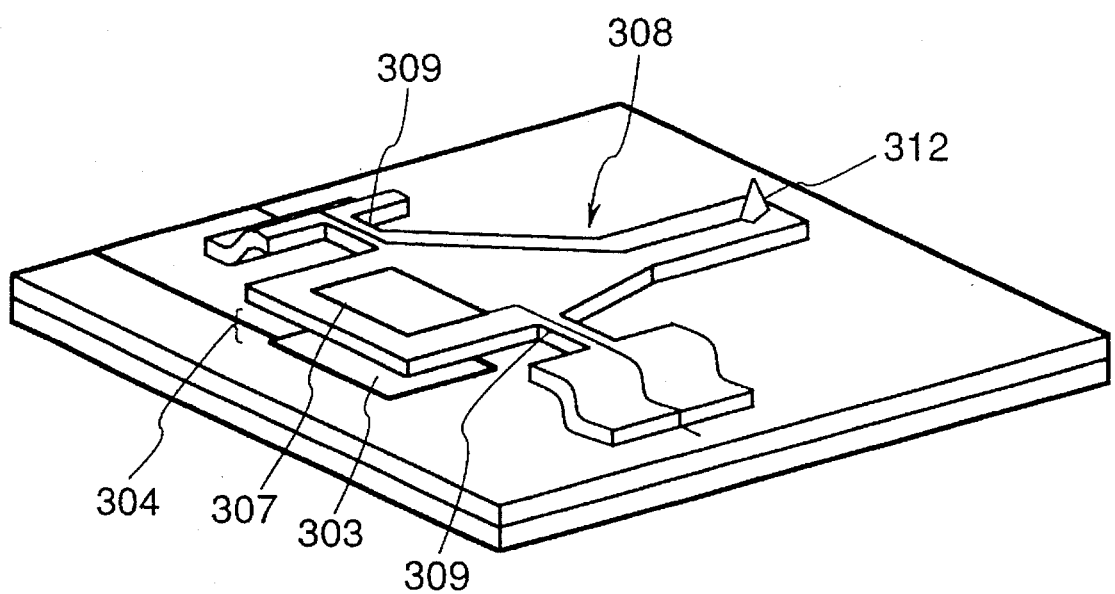
FIG. 9 is a perspective view of a fourth embodiment of the probe of torsion lever structure of the present invention.

FIG. 9 is a perspective view of a 4th embodiment of the probe of torsion lever structure of the present invention.

The present embodiment is different from the 1st embodiment in that, as shown in FIG. 9, the flat plate-shaped driving unit 308 is approximately shaped as a triangular tennis racket in which the tip 312 is formed at the end of the racket grip portion while the upper electrode 307 is formed at the other end opposed to the fixed electrode 303, and that the two beams 309 are provided at a position closer to the upper electrode 307 (rear end) than the center of the flat plate-shaped driving unit 308. Other configurations and the preparation method are similar to those in the 1st embodiment and will not, therefore, be explained further.

The prepared probe had a longitudinal length of 220 μm and a width of 80 μm in the flat plate-shaped driving unit 308, and a gap 304 of 2.5 μm. The beams 309 were positioned at a distance of 140 μm from the front end of the flat plate-shaped driving unit 308, and the aforementioned weight ratio W of the first and second areas was 0.96.

Also such configuration can provide, as in the 1st embodiment, a movable distance of the tip 312 longer than the magnitude of the gap 304, as the front end side having the tip 312 is longer than the rear end side.

When the probe of the present embodiment was driven by a voltage application between the fixed electrode 303 and the upper electrode 307, the movable distance of the tip 312 was 3.3 μm, larger than the magnitude of the gap 304, and the resonance frequency was as high as 24 kHz.

[5th embodiment]

Figure 10:
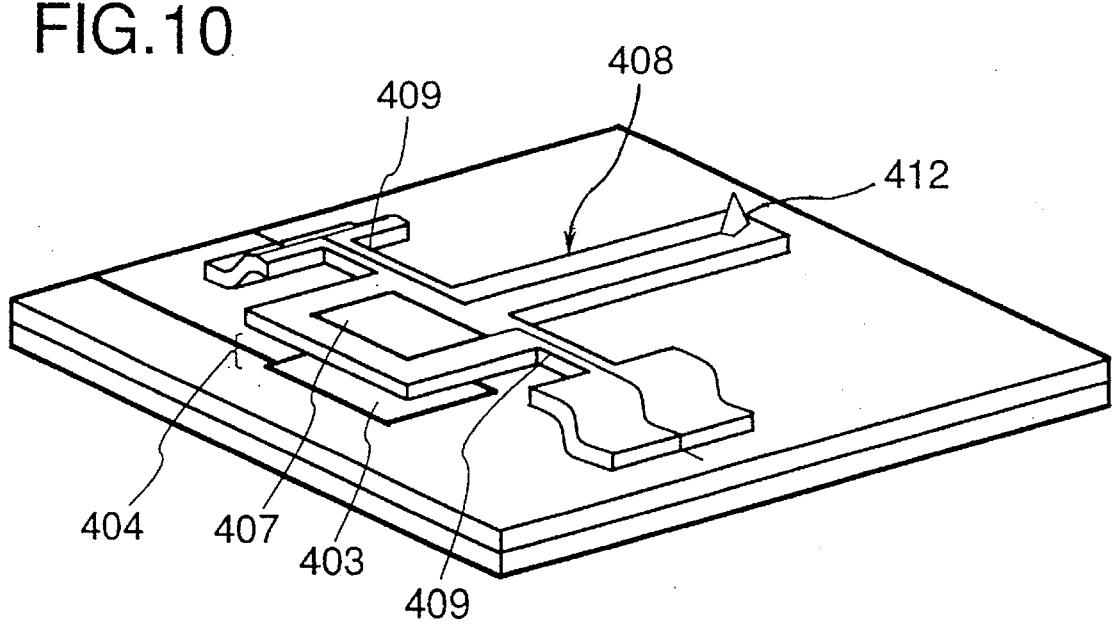
FIG. 10 is a perspective view of a fifth embodiment of the probe of torsion lever structure of the present invention.

FIG. 10 is a perspective view of a 5th embodiment of the probe of torsion lever structure of the present invention.

The present embodiment is different from the 1st embodiment in that, as shown in FIG. 10, the first area is formed as an exteded slat having the tip 412 at the end thereof. Other configurations and the preparation process are similar to those in the 1st embodiment, and will not, therefore, be explained further.

The prepared probe had a longitudinal length of 200 μm and a width of 80 μm in the flat plate-shaped driving unit 408, and a gap 404 of 2.5 μm. The beams 409 were positioned at a distance of 138 μm from the front end of the flat plate-shaped driving unit 408, and the aforementioned weight ratio W of the first and second areas was 0.5.

Also such configuration can provide, as in the 1st embodiment a movable distance of the tip 412 longer than the magnitude of the gap 404, as the front end side having the tip 412 is longer than the rear end side.

When the probe of the present embodiment was driven by a voltage application between the fixed electrode 403 and the upper electrode 407, the movable distance of the tip 412 was 3.4 μm, larger than the magnitude of the gap 404, and the resonance frequency was 18 kHz.

The foregoing 1st to 5th embodiments disclose probes of torsion lever structure driven by electrostatic force, but the present invention is not limited by the driving method and there can be utilized, for example, magnetic attractive or repulsive force or thermal beam deformation.

[6th embodiment]

The present embodiment describes a scanning probe microscope utilizing plural (9) probes of torsion lever structure of the present invention.

Figure 11:
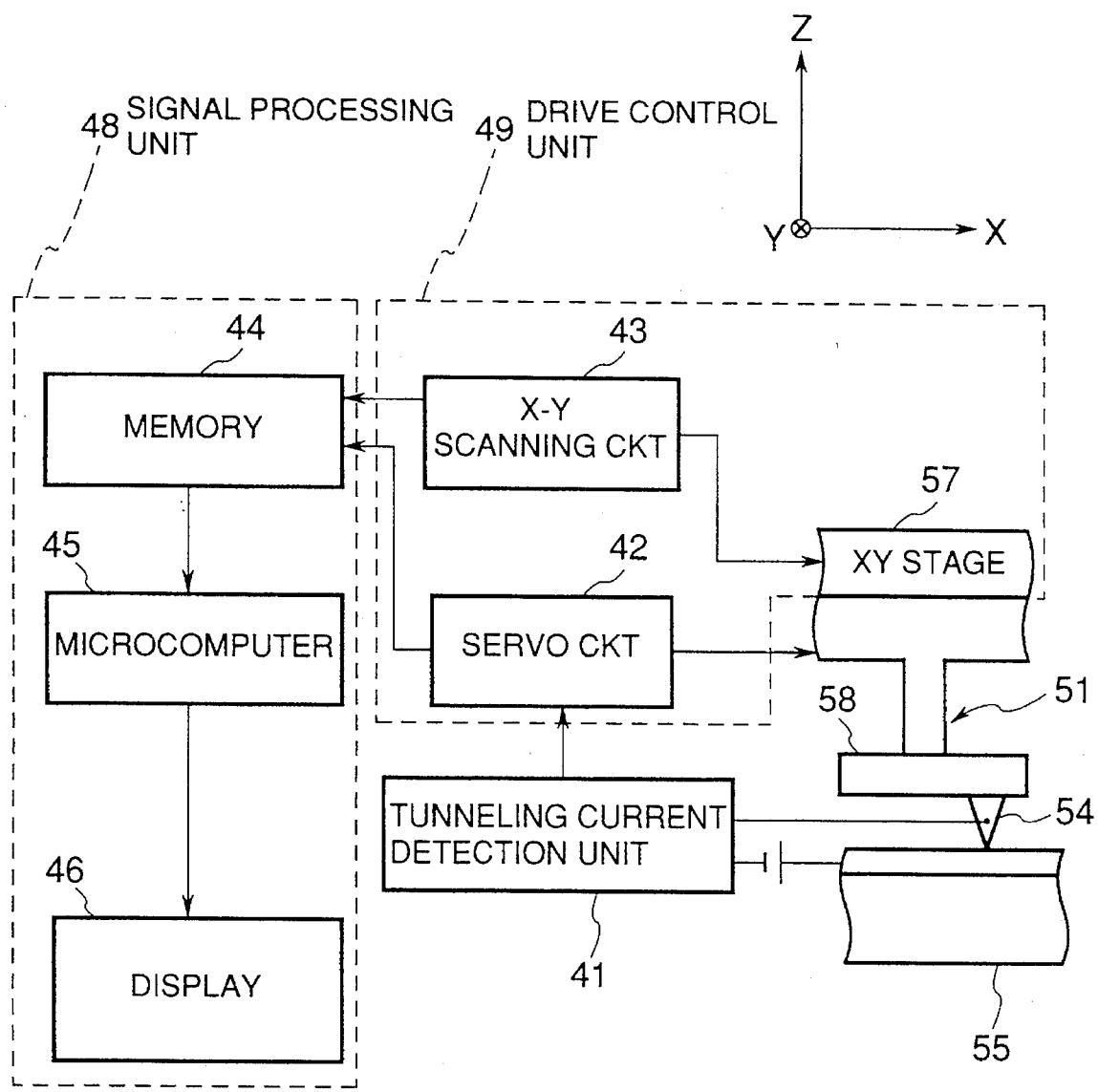
FIG. 11 is a block diagram showing the principal structure of an embodiment of the scanning probe microscope employing a plurality of the probes of the present invention.

FIG. 11 is a block diagram showing the principal structure of an embodiment of the scanning probe microscope utilizing probes of the present invention.

Referring to FIG. 11, an XY stage 57 is provided with a probe 51, similar to that explained in the foregoing embodiments. On an observed substrate 55 there are provided, in opposed relationship thereto, a plurality of probes 51 (only one being illustrated), and a drive control unit 49 and a tunneling current detection unit 41 are provided for each of such plural probes 51. Consequently the tunneling current detection and the displacement control are conducted independently for each probe 51, by the corresponding tunneling current detection unit 41 and drive control unit 49.

The tunneling current detection unit 41 is composed of a circuit for amplifying the tunneling current, flowing between the tip 54 and the observed substrate 55.

The drive control unit 49 is composed of a servo circuit 42, an X-Y scanning circuit 43 and an XY stage 57. The servo circuit 42 controls the movement of the tip 54 in the Z-axis direction, by applying a control voltage to the fixed electrode (not shown) of the probe 51. The X-Y scanning circuit 43 moves the probe 51 in the X and Y directions, by driving the XY stage 57.

A signal processing unit 48 is composed of a memory 44, a microcomputer 45 and a display 46. The memory 44 serves to temporarily store the output of the servo circuit 42 and the X, Y positional information of the probe 51. The microcomputer 45 serves to process the data stored in the memory 44, and the display 46 provides an image based on the information processed by the microcomputer 45.

In such configuration, in the measurement state, the probe 51 is moved in scanning motions in the X and Y directions by the XY stage 57, and the tunneling current flowing between the tip 57 and the observed substrate 55 is detected. The detected tunneling current is amplified by the tunneling current amplifier 14 and supplied to the servo circuit 42.

The servo circuit 42 applies a control voltage to the fixed electrode (not shown) of the probe 51 in the course of the scanning operation thereof, thereby controlling the height of the tip 54 in the Z-axis direction, so as to obtain a constant tunneling current.

Information of the observed substrate 55 in the Z-axis direction can be obtained from the output of the servo circuit 42. The above-mentioned information and two-dimensional information of the surface of the observed substrate 55 obtained by the X, Y scanning motion of the probe 51 are processed by the microcomputer 45 and shown on the display 46, whereby the surfacial information of said observed substrate 55 can be observed in the form of image information.

The use of the probes of the present invention in the above-explained scanning probe microscope provides a system having a sufficiently large movable distance of the tip, enabling easy control and capable of high-speed drive with suppressed lowering of the resonance frequency.

The scanning mechanism of the XY stage 57 can be based on various control mechanisms such as a cylindrical piezoelectric actuator, parallel springs, a differential micrometer, a voice coil or an inch worm.

The above-explained scanning probe microscope was used for the observation of an Au substrate having ripples of about 3 μm in a part of the surface thereof. Despite of the significant magnitude of the surface ripples, all the nine probes satisfactorily followed the shape of the surface ripples, whereby the surface information of the substrate could be obtained with a high resolving power.

[7th embodiment]

The present embodiment describes an information record/reproducing apparatus utilizing plural (25) probes of torsion lever structure of the present invention.

Figure 12:
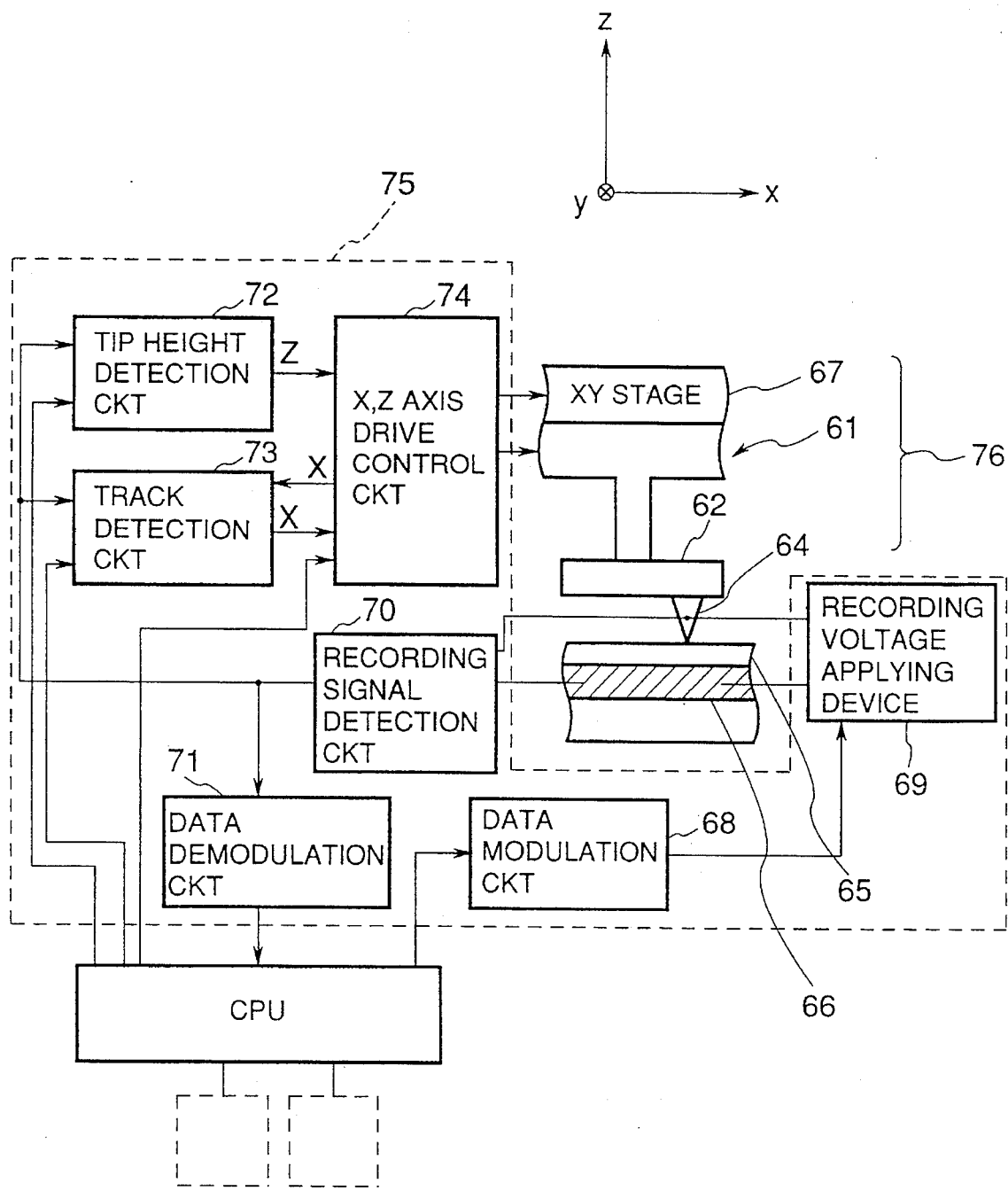
FIG. 12 is a block diagram showing the principal structure of an embodiment of the information record/reproducing apparatus employing a plurality of the probe of the present invention.

FIG. 12 is a block diagram showing the principal structure of an embodiment of the information record/reproducing apparatus utilizing probes of the present invention.

As shown in FIG. 12, the information record/reproducing apparatus of the present embodiment is composed of a record/reproducing head unit 76 for information recording on a recording medium 65 and information reproduction therefrom, and a record/reproducing circuit 75 for controlling the driving operation of the record/reproducing head unit 76 and for effecting information recording on the recording medium 65 and information reproduction therefrom.

In an opposed relationship to the recording medium 65, there are provided plural record/reproducing head units 76 (only one being illustrated), and the record/reproducing circuit 75 is provided for each of such plural record/reproducing head unit 76. Consequently the recording and reproduction by each probe 61, and the displacement control (tracking, gap control etc.) of each probe 61, are conducted independently for each probe by the corresponding record/reproducing circuit 75.

The record/reproducing head unit 76 is composed of a probe 61, similar to the one described in the foregoing embodiments, and an XY stage 67 for moving the probe 61 in scanning motions in the X and Y directions.

Opposed to said record/reproducing head unit 76, there is provided the recording medium 65 for information recording, under which provided is a lower electrode 66 for applying a voltage between the recording medium 65 and the tip 64 on the probe 61.

The recording medium 65 is composed of a metal, a semiconductive substance, an oxide or an organic thin film which can deform, by the tunneling current generated from the tip 64, the surface of the recording medium 65 in convex form (Staufer, Appl. Phys. Letters, 51(4), 27 Jul. 1987, p.244) or in concave form (Heinzelmann, Appl. Phys. Letters, Vol. 53, No. 2, 4 Dec., 1988, p.2447), or an organic thin film or the like of which electrical properties vary (for example electrical memory effect) by the tunneling current.

The organic thin film whose electrical properties vary is composed for example of a material disclosed in the Japanese Patent Laid-open Application No. 63-161552 and is preferably formed as a Langmuir-Brogett (LB) film. In the present embodiment, the lower electrode 66 was formed by depositing Cr with a thickness of 5 nm and then Au with a thickness of 30 nm by vacuum evaporation on a quartz glass substrate, and the recording medium was formed thereon by forming four layers of LB film of SOAZ (squalirium-bis-6-octylazulene).

The scanning mechanism of the XY stage 67 can be based on various control mechanisms such as a cylindrical piezoelectric actuator, parallel springs, a differential micrometer, a voice coil or an inch worm.

On the other hand, the record/reproducing circuit 75 is composed of a data modulation circuit 68, a recording voltage application device 69, a recording signal detection circuit 70, a data demodulation circuit 71, a tip height detection circuit 72, an x-z axes drive control circuit 74 and a track detection circuit 73.

The data modulation circuit 68 modulates the data to be recorded into signals suitable for recording, at the data recording operation.

The recording voltage application device 69 applies a voltage between the lower electrode 66 and the tip 64, for data recording on the recording medium 65 or data reproduction therefrom.

The recording signal detection circuit 70 detects the tunneling current flowing between the tip 64 and the lower electrode 66 when a voltage is applied therebetween.

The data demodulation circuit 71 restores the data, at the data reproduction, from the tunneling current detected by the recording signal detection circuit 70.

The tip height detection circuit 72 receives the detection signal from the recording signal detection circuit 70, cuts off the high frequency components generated by the information bits, then processes the remaining signal and supplies the x,z drive control circuit 74 with a control signal so as to maintain said remaining signal constant. In response to said control signal from the tip height detection circuit 72, the x,z drive control circuit 74 vertically moves the tip 64. Through the functions of the tip height detection circuit 72 and the x,z drive control circuit 74, the distance between the tip 64 and the recording medium 65 is maintained constant.

The track detection circuit 73 detects, in the course of scanning motion of the tip 64 on the recording medium 65, the aberration from the track where data are to be recorded on the recording medium 65, or from the recorded data train. Thus the track detection at the information recording or reproduction is executed by the track detection circuit 73.

For data recording on the recording medium 65 in the above-explained configuration, the tip 64 is brought to a predetermined short distance to the recording medium 65, and a rectangular pulse voltage for example of a magnitude of 3 V and a duration of 50 ns is applied by the recording voltage application device 69, whereby the recording medium 65 undergoes a change in the characteristics to generate a portion with a lower electrical resistance. Thus the information recording can be achieved by forming portions of lower electrical resistance on the surface of the recording medium 65, corresponding to the signals released from the data modulation circuit 68, while the surface of said recording medium 65 is scanned by the tip 64.

At the data reproduction, the tip 64 and the recording medium 65 are maintained at a predetermined distance, and a voltage lower than that at the recording, for example a DC voltage of 200 mV, is applied between the tip 64 and the lower electrode 66. By scanning the recorded data train on the recording medium 65 by the tip 64, the tunneling current detected by the recording signal detection circuit 70 corresponds the recorded data signals. Data can be reproduced by subjecting the detected tunneling current to current-voltage conversion and demodulating the obtained voltage signals by the data demodulation circuit 68.

The use of the probes of the present invention in the above-explained information record/reproducing apparatus provides a system having a sufficiently large movable distance of the tip, enabling easy control and capable of high-speed drive with suppressed lowering of the resonance frequency.

The recording layer to be employed in the recording medium 65 of the present embodiment can be composed of any material that enables detection of the information recorded on said recording layer, by means of the tunneling current flowing between the tip 64 and the recording layer. For example, for information recording by surface irregularity formation, there can be used a HOPG (highly oriented pyrolithic graphite) cleaved substrate, a Si wafer, an evaporated or epitaxially grown metal film of Au, Ag, Pt, Mo or Cu, or a metallic glass such as $Rh_{25}Zr_{75}$ or $Co_{35}Tb_{65}$. Also for data recording by surface electron state, there can be used a thin film of amorphous Si, π-electron organic compound or chalcogenide compound.

The quartz substrate employed in the present embodiment partially had surface ripple of about 3 μm, but, despite of the magnitude of such ripples, all the probes satisfactorily followed the form of the surface ripples, so that the information recording and reproduction could be conducted without error.

Though the present embodiment is applied to an information record/reproducing apparatus, the present invention is naturally applicable likewise to an apparatus designed only for information recording or reproduction, or to a scanning apparatus for tunneling current detection.

The foregoing 6th and 7th embodiments disclose a scanning probe microscope and an information record/reproducing apparatus utilizing the tunneling current, but the probe of torsion lever structure of the present invention is applicable also to a scanning probe microscope or an information record/reproducing apparatus utilizing other physical actions such as the interatomic force.

What is claimed is:

1. A probe of torsion lever structure provided with a flat plate-shaped driving unit formed on a substrate with a gap therebetween, two beams positioned along a straight line parallel to said substrate and rotatably supporting said flat plate-shaped driving unit relative to said substrate, drive means for driving said flat plate-shaped driving unit, and a tip for information input/output provided at an end of said flat plate-shaped driving unit, wherein:

said two beams are provided at a position, between said end of said flat plate-shaped driving unit and the other end thereof, closer to said the other end than the center between said end and said the other end.

2. A probe according to claim 1, satisfying a relation;

weight of first area/weight of second area<1, wherein said first area is an area, having said tip, of two areas of said flat plate-shaped driving unit divided by the rotary axis passing through said two beams, and said second area is the other area, without said tip, of said two areas.

3. A probe according to claim 2, satisfying a relation: 0.5<weight of first area/weight of second area<1.

4. A probe according to claim 2, satisfying a relation: 0.8<weight of first area/weight of second area<1.

5. A probe according to claim 1, further comprising a hole in an area, without said tip, of the two areas of said flat plate-shaped driving unit divided by the straight line passing through said two beams.

6. A probe according to claim 1, wherein said drive means is a pair of electrodes which are respectively provided in mutually opposed positions of said substrate and said flat plate-shaped driving unit.

7. A scanning probe microscope comprising:

a flat plate-shaped driving unit formed on a substrate with a gap therebetween;

two beams positioned along a straight line parallel to said substrate and rotatably supporting said flat plate-shaped driving unit relative to said substrate;

drive means for driving said flat plate-shaped driving unit;

a tip for information input/output provided at an end of said flat plate-shaped driving unit;

wherein said two beams are provided at a position, between said end of said flat plate-shaped driving unit and the other end thereof, closer to said the other end than the center between said end and said the other end;

means for detecting a physical action taking place between said tip and a specimen to be observed; and means for generating surface information of said specimen based on the result of detection by said detection means.

8. An information record/reproducing apparatus comprising:

a flat plate-shaped driving unit formed on a substrate with a gap therebetween;

two beams positioned along a straight line parallel to said substrate and rotatably supporting said flat plate-shaped driving unit relative to said substrate;

drive means for driving said flat plate-shaped driving unit;

a tip for information input/output provided at an end of said flat plate-shaped driving unit;

wherein said two beams are provided at a position, between said end of said flat plate-shaped driving unit and the other end thereof, closer to said the other end than the center between said end and said the other end; and means for recording information on a recording medium and reproducing information therefrom, by means of said tip.

* * * * *